United States Patent [19]

Hehl

[11] 4,047,871
[45] Sept. 13, 1977

[54] DIE CLOSING UNIT FOR INJECTION MOLDING MACHINE

[76] Inventor: Karl Hehl, Arthur-Hehl-Strasse 32, 7298 Lossburg 1, Germany

[21] Appl. No.: 610,280

[22] Filed: Sept. 4, 1975

[30] Foreign Application Priority Data

Sept. 11, 1974   Germany ............................ 2443509
Sept. 11, 1974   Germany ............................ 2443510

[51] Int. Cl.² .............................................. B29F 1/06
[52] U.S. Cl. ............................... 425/450.1; 425/451.2; 249/68; 425/DIG. 223
[58] Field of Search ............. 425/247 R, 450.1, 451.2, 425/451.9, DIG. 220, DIG. 221, DIG. 222, DIG. 223

[56] References Cited

U.S. PATENT DOCUMENTS

| | | | |
|---|---|---|---|
| 2,691,799 | 10/1954 | Moeller | 425/450.1 |
| 2,718,662 | 9/1955 | Bohannon et al. | 425/DIG. 223 |
| 2,988,778 | 6/1961 | Chage et al. | 425/DIG. 222 |
| 3,120,039 | 2/1964 | Stubbe et al. | 425/DIG. 223 |
| 3,158,903 | 12/1964 | Fischer et al. | 425/450.1 X |
| 3,346,924 | 10/1967 | Lombard | 425/242 R X |
| 3,433,290 | 3/1969 | Eggenberger et al. | 425/242 R X |
| 3,465,387 | 9/1969 | Allard et al. | 425/DIG. 223 |
| 3,801,256 | 4/1974 | Farrell | 425/242 R X |

FOREIGN PATENT DOCUMENTS

| | | | |
|---|---|---|---|
| 2,119,204 | 11/1971 | Germany | 425/DIG. 223 |
| 1,114,633 | 5/1968 | United Kingdom | 425/DIG. 223 |

Primary Examiner—J. Howard Flint, Jr.
Attorney, Agent, or Firm—Joseph A. Geiger

[57] ABSTRACT

A push-type die closing unit for injection molding machines in which a stationary die carrier plate, a rearwardly spaced head plate, and four tie rods form a rigid guide structure for a movable die carrier frame to which the piston rod of a linear actuator with power cylinder and auxiliary cylinder is centrally connected, for the direct and cant-free transmission of elevated closing pressures to the die carrier frame and die. The die carrier frame has axially spaced walls joined by four guide sockets and by pressure transfer ribs, a central accessory space defined therebetween accommodating, in conjunction with a hollow forward portion of the piston rod, an ejection device or other accessory device and a hydraulic drive therefor.

20 Claims, 7 Drawing Figures

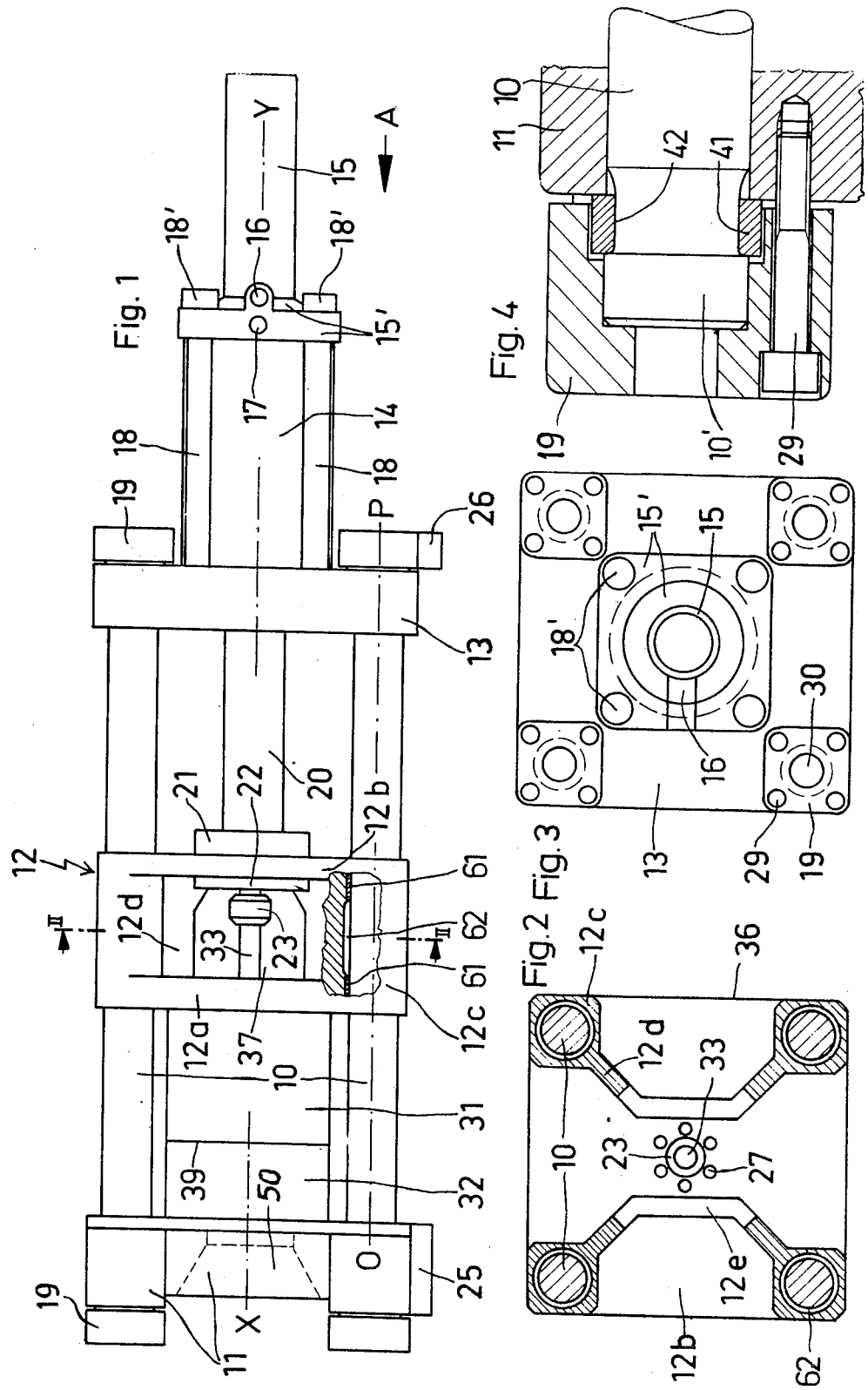

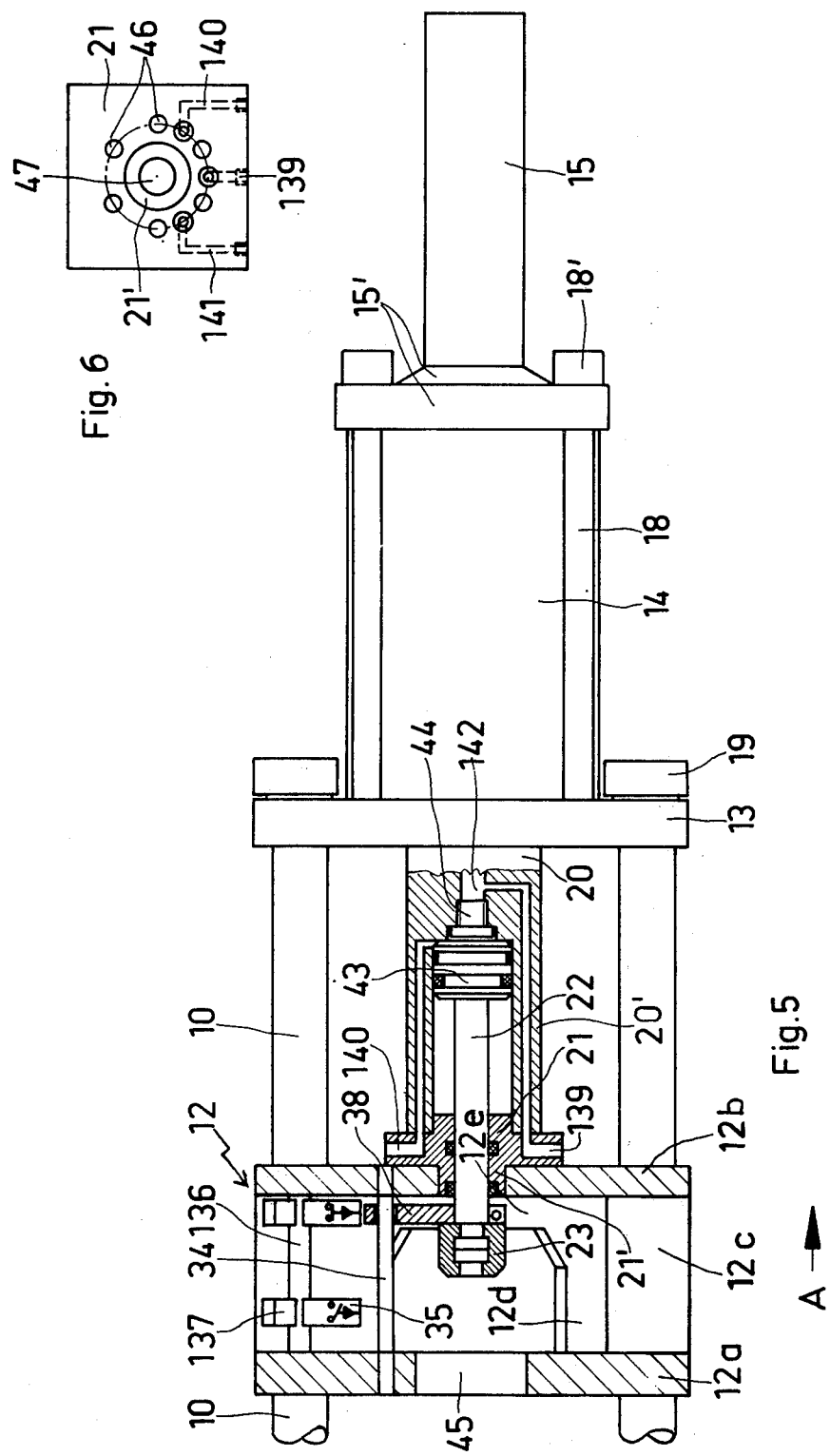

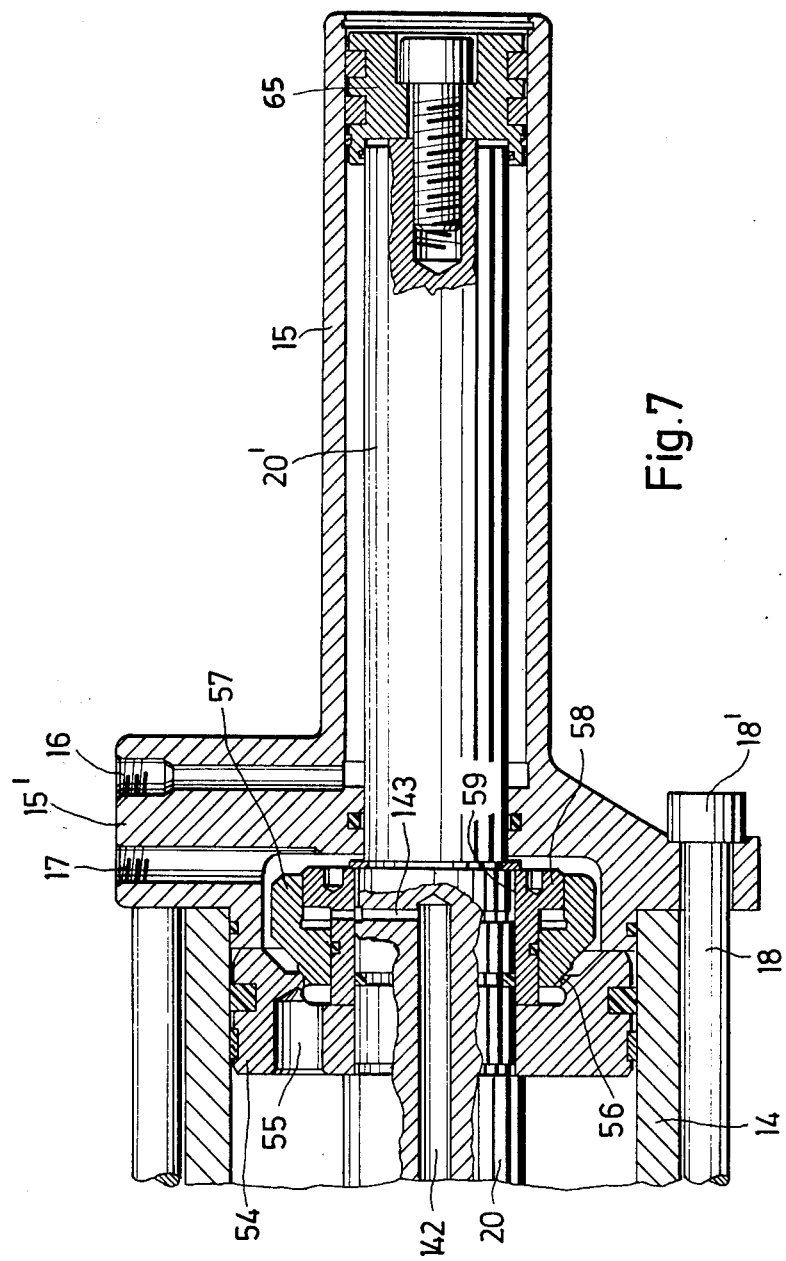

DIE CLOSING UNIT FOR INJECTION MOLDING MACHINE

BACKGROUND OF THE INVENTION

1. Field of the Invention

The present invention relates to die closing units for injection molding machines, and more particularly to die closing units of the push-type, i.e. where the hydraulic cylinder which opens and closes the molding die has its axis oriented in the direction of die movement and exerts a pushing action on the movable die half during the closing stroke.

2. Description of the Prior Art

Injection molding machines having push-type die closing units are known from the prior art. One known die closing unit of this type features an arrangement in which the thrust from the power cylinder is transmitted to the movable die carrier plate by means of two piston rods, the movable die carrier plate being comparable in thickness to the stationary die carrier plate. This prior art structure thus features an arrangement in which the force acting on the power piston is transmitted to the movable die carrier plate along multiple lines of force transmission located outside the center axis of the die closing unit and arranged symmetrically with respect to the latter.

In the past, it has been the generally accepted belief among specialists in the field that it is the aforementioned pattern of force transmission lines which gives the best safety against canting of the movable die carrier plate and which, under conditions of extremely high closing pressures, assures the highest possible dimensional consistency of the injection molded parts. An additional reason why it was heretofore considered necessary to split the force transmission from the power piston to the movable die carrier plate along at least two force transmission lines spaced oppositely from the center axis of the die closing unit was the fact that only this type of arrangement would offer the necessary space for the arrangement of an ejection device, an unscrewing device, or other special accessory units which had to be mounted on the back side of the movable die carrier plate in alignment with the center axis. A die closing unit of this type is disclosed in U.S. Pat. No. 3,456,297.

SUMMARY OF THE INVENTION

It therefore came as a complete surprise, when it was discovered that the objective of maximum safety against canting and of achieving a corresponding consistency of the dimensions and quality of the injection molded parts, in conjunction with a more wear resistant die closing unit, could be attained without a noticeable increase in material and manufacturing costs, by using a novel design arrangement in which a single piston rod transmits the closing thrust from the power piston to the movable die carrier plate, and where the latter has the form of a die carrier frame consisting essentially of a mounting wall on its forward side, a pressure transfer wall on its rear side, and several angularly spaced, radially offset pressure transmitting elements arranged between these two walls.

This novel structural arrangement of the parts which transmit the thrust from the power piston to the movable die half makes it possible to transmit the entire thrust along a single force transmission line coinciding with the center axis of the die closing unit. One advantage of this arrangement is the fact that only a single piston rod seal is necessary on that side of the power cylinder which faces towards the molding die. This makes it possible to replace the previously necessary multiple seals, which are subject to leakage through operational wear, with a single, larger and more robust seal. This single piston rod seal is also more easily accessible for replacement.

It is true that from an arrangement in which the force transmission takes place along a single transmission line in the center axis of the die closing unit, there would normally follow a higher risk of the movable die carrier plate to develop a canting tendency. This canting tendency, however, is completely suppressed by the present invention, through a novel configuration of the movable die carrier plate in the form of a die carrier frame at the inside of which is provided room for the ejector unit and other special units which need to be mounted in the center axis of the die closing unit, immediately behind the movable die half.

Detailed quality comparisons have revealed that the dimensional consistency of injection molded parts such as precision-molded parts for watches, for example, is higher, when a movable die carrier frame as proposed by the present invention is utilized, especially when the movable die carrier frame is equipped with long guide sockets engaging the tie rods with two axially spaced guide bushings arranged inside each guide socket.

The present invention further suggests a novel arrangement of an ejecting device, located inside the movable die carrier plate or frame, the centrally connected piston rod of the power cylinder having a hollow length portion serving as a drive cylinder for the ejector piston. This configuration allows for a very compact design of the die closing unit, the addition of the ejecting unit having no effect on the axial length of the movable die carrier frame and on the axial distance between the stationary plates carrying the tie rods.

In a preferred embodiment of the invention, the stability and guidance of the novel die carrier frame is further improved, with a resulting corresponding further improvement in the dimensional consistency of the injection-molded parts, by using a tie rod construction in which the tie rods engage the stationary die carrier plate and the oppositely located stationary head plate with their maximum diameter, i.e. without the commonly used axial shoulder and pressure transmitting clamping nut. In their place, the improved tie rod connection features a shallow groove on the tie rod extremity reaching through the plate to which it is connected, a split abutment ring being seated in the groove and axially clamped against the outer side of the plate by means of a clamping cap which also retains the split ring inside its groove. This arrangement produces an improved tie rod connection, inasmuch as the force transmission between the plate and the tie rod during application of the closing pressure no longer involves a threaded connection. In addition to the resulting operational improvement in terms of guidance and rigidity, this tie rod connection represents a saving in manufacturing costs, without entailing an increase in the overall weight of the die closing unit. The proposed improved tie rod connection is described in more detail in my copending application Ser. No. 689,813, filed May 25, 1976.

A die closing unit incorporating the present invention preferably features a square outline, using four equidistant tie rods located at the four corners of a regular square, the stationary die carrier plate and head plate, as well as the movable die carrier frame having a corresponding square outline. This arrangement gives the die carrier plate four guide sockets at a maximum distance from the center axis of the die closing unit. The transmission of the closing pressure from the pressure transfer wall on the rear of the die carrier frame to the die mounting wall on the front of the frame is obtained by means of these guide sockets and by means of four radially inwardly extending pressure transfer ribs connecting the two walls of the frame. These ribs stop a distance short of the center, thereby leaving adequate room for an ejecting device or some other necessary special accessory device.

Lastly, the present invention suggests a power cylinder arrangement in which the stationary head plate serves as one of the end flanges of the cylinder, a smaller square flange serving as the opposite end flange, and four cylinder tie rods extend between these end flanges.

BRIEF DESCRIPTION OF THE DRAWINGS

Further special features and advantages of the invention will become apparent from the description following below, when taken together with the accompanying drawing which illustrate, by way of example, a preferred embodiment of the invention, represented in the various figures as follows:

FIG. 1 shows in an elevational view a die closing unit embodying the present invention;

FIG. 2 is a cross section through the movable die carrier frame of the unit of FIG. 1, taken along line II—II thereof;

FIG. 3 is an end view of the unit of FIG. 1, as seen in the direction A;

FIG. 4 shows an enlarged longitudinally cross-sectioned portion of the die closing unit of FIG. 1, representing a tie rod connection;

FIG. 5 shows the drive portion of the die closing unit of FIG. 1 with portions thereof longitudinally sectioned to expose the ejection unit drive;

FIG. 6 shows an end view of the thrust plate of the die closing unit of FIG. 5; and FIG. 7 shows in an enlarged longitudinal cross section the auxiliary cylinder and a portion of the power cylinder.

DESCRIPTION OF THE PREFERRED EMBODIMENT

Referring to FIG. 1 of the drawing, there is shown a die closing unit for an injection molding machine, the stationary die half 32 being mounted on a stationary die carrier plate 11 and the movable die half 31 being mounted on a movable die carrier frame 12. Four tie rods 10, arranged in the four corners of a regular square and extending horizontally between the stationary die carrier 11 and a likewise stationary head plate 13 form a guide structure for the die carrier frame 12 which is rigid in all directions.

The head plate 13 is not only part of the guide frame of the die closing unit, it also serves as an end flange for the power cylinder 14. This power cylinder extends axially in the center axis of the die closing unit, having a rear end flange 15' to which is attached a coaxially extending auxiliary cylinder 15. The piston rod 20, carrying a main piston inside the power cylinder 14 and an auxiliary piston inside the auxiliary cylinder 15, is connected at its forward extremity to the movable die carrier frame 12 which is guided for its opening and closing motion along the four tie rods 10. The die carrier frame 12 consists essentially of two axially spaced walls, a die mounting wall 12a on the front side and a pressure transfer wall 12b on the rear side. The die mounting wall 12a has a centering bore 45 (FIG. 5) for the movable die half 31. The two walls are connected axially by four guide sockets 12c which surround and engage the tie rod 10 and by pressure transfer ribs 12d extending radially inwardly from the guide sockets 12c. The four guide sockets 12c are comparatively long in the axial direction, each having two axially spaced guide bushings 61 fitted into its guide bore. A radially recessed bore portion 62 separates the seats of the two guide bushings 61. This arrangement assures an absolutely cant-free guidance of the die carrier frame, while minimizing the frictional resistance between the die carrier frame 12 and the tie rods 10.

The piston rod 20 is connected to the pressure transfer wall 12b of frame 12 by means of a thrust plate 21 which is bolted to the wall 12b by means of a series of clamping bolts 27, as shown in FIG. 2. The same figure also shows that the pressure transfer ribs 12d extend radially inwardly from the guide sockets 12c about half the distance between the center axis x–y and the tie rod axis o–p. Near the pressure transfer wall 12b, the four pressure transfer ribs 12d are joined in pairs by means of two connecting ridges 12e extending parallel to the lateral edges 36 of the die carrier frame walls 12a and 12b. The entire movable die carrier frame as illustrated and described is preferably manufactured as an integral casting.

The thrust plate 21 connecting the piston rod 20 to the pressure transfer wall 12b of frame 12 is likewise square in outline, having a side length approximately twice the diameter of the piston rod 20. This size of the thrust plate 21 preferably relates to the pressure transfer ribs 12d in such a way that the corner portions of plate 21 and the ribs 12d overlap on opposite sides of the pressure transfer wall 12b, meaning that the maximum radial extent of the thrust plate 21 is greater than the minimum radial distance of the pressure transfer ribs 12d. In the preferred embodiment of the invention, this result is obtained by widening the pressure transfer ribs 12d radially inwardly towards the center axis in a tapering transition portion adjoining the pressure transfer wall 12b. Near the die mounting wall 12a, and over a major portion of their axial length, the pressure transfer ribs 12d are radially spaced apart, however, so as to define a space 37 for the accommodation of an ejecting device or other special accessory device, such as a device for the unscrewing of thread cores, for example.

In the embodiment illustrated in FIG. 1, the accessory space 37 accommodates an ejecting device of which a piston rod 22, a detachable coupling 23, and a connecting rod 33 are shown. The latter reaches through the die mounting wall 12a and into the molding die 31, where it is connected to an ejector plate (not shown). As can be seen in FIG. 5, the drive for the ejecting device is a hydraulic linear actuator, a forward portion 20' of the piston rod 20 being hollow and serving as a cylinder for an ejector drive piston 43 attached to the ejector piston rod 22. The latter reaches forwardly through a bore 47 in the thrust plate 21 which also serves as an end flange for the drive cylinder 20'. A centering extension 21' of the thrust plate engages a matching bore of the pressure transfer wall 12b. A number of holes 46 (FIG. 6) accommodate the bolts 27 which clamp the piston rod 20 to the wall 12b.

The ejector drive cylinder is a double-acting cylinder, the connection 140 leading to the rear end of the cylinder 20', the connection 141 leading to its front end. A plug 44 separates the cylinder space from a central flow channel 142 leading to the valve plunger of a bypass valve associated with the power piston of the power cylinder 14, the operation of which is explained further below. The flow channel 142 communicates with the outside connection 139.

To the protruding portion of the ejector piston rod 22, just behind its coupling 23, is clamped a radial arm 38 whose far end has a guide bore engaging an axially oriented guide rod 34. The radial arm 38 cooperates with two axially spaced proximity switches 35 controlling the end positions of the ejector drive piston by means of hydraulic solenoid valves. The switches 35 are attached to two axially adjustable supports 137 carried by a pair of mounting rods 136. By axially repositioning the switch supports 137 on their mounting rods 136, it is possible to adjust both end positions of the ejection stroke in accordance with the needs of the particular molding die.

As mentioned earlier, the head plate 13 of the guide frame assembly serves also as an end flange for the power cylinder 14, the cylinder casing itself being centered with respect to the head plate 13 by means of an annular centering recess arranged in the wall of the head plate 13. The rear end flange of the power cylinder 14 is likewise square in outline, but considerably smaller than the head plate 13. Four heavy cylinder tie rods 18 engage threaded bores inside the head plate 13, their heads 18' engaging the flange 15'. This flange, having likewise an annular recess centering the casing of the power cylinder 14, serves at the same time as a mounting flange for the auxiliary cylinder 15 which extends coaxially from the rear of the power cylinder 14. The piston rod 20 extends through the entire length of the power cylinder 14 and into the auxiliary cylinder 15, carrying an auxiliary piston 65 (see FIG. 7) at its rear extremity. The operational relationship between the power cylinder 14 and the auxiliary cylinder 15 is explained further below.

In FIG. 4 of the drawing is illustrated an enlarged cross-sectional detail which is representative of the eight tie rod connections — two for each tie rod 10 — by means of which the four tie rods are rigidly clamped to the stationary die carrier plate 11 and to the head plate 13, respectively. For this purpose, each tie rod connection includes a plate bore whose diameter is equal to the maximum diameter of the tie rod 10, meaning that the tie rod no longer has a reduced diameter and an abutment shoulder up to which it is inserted into the plate bore. In its place, the improved tie rod connection of FIG. 4 features a shallow groove 42 in the tie rod 10, near the outwardly protruding extremity of the latter, with a split abutment ring 41 seated in said groove and engaging the outer side of the plate 11 or 13, respectively. A clamping cap 19, engaged over the end portion 10' of the tie rod 10, exerts an axial preload on the connection by axially clamping the tie rod 10 against the plate, through the intermediate of the abutment ring 41. The clamping force is produced by means of a number of clamping bolts 29 engaging matching threaded bores in the plate 11. Identical clamping caps 19 and clamping bolts 29 preload the tie rod connections at the head plate 13 (FIG. 3). In addition to increasing the plate bore to the maximum tie rod diameter, thus eliminating the stress concentration condition at the abutment shoulder, the improved tie rod connection further offers the advantage that the closing pressure is no longer transmitted to the plates 11 and 13 via a threaded clamping member, as was the case previously, but that this force is transmitted directly to the plate through the abutment faces of the split abutment ring 41. This novel tie rod connection is described in more detail in my copending application Ser. No. 689,183, filed May 25, 1976.

The injection unit for the injection of material into the molding die 31, 32 may be mounted perpendicularly to the die separation plane 39, in which case the unit is arranged in the center axis $x-y$ of the die closing unit, engaging the bore 50 of the stationary die carrier plate 11. Alternatively or additionally, injection may take place in the die separation plane 39 itself, in which case the injection unit is mounted radially with respect to the die carrier plate 11, in alignment with the separation plane 39 between the die halves 31 and 32.

As can be seen in FIG. 7, the piston rod 20 of the power cylinder 14 reaches through the latter into the auxiliary cylinder 15. It carries a large power piston 54 inside the cylinder 14 and a smaller auxiliary piston 65 inside the auxiliary cylinder 15. Reference is made for this purpose to my copending application Ser. No. 546,036, filed Jan. 31, 1975, now U.S. Pat. No. 3,935,791. The diameter of the auxiliary piston 65 is preferably equal to the diameter of the piston rod 20, where it reaches through the head plate 13. The piston rod portion 20' reaches through the end flange 15' with a reduced diameter. The power piston 54 moving inside the power cylinder 14 has a number of axial bypass channels 55 extending from one axial side of the piston 54 to the other side, the bypass channels 55 being closable by means of a hydraulically operated valve plunger 57 cooperating with a valve seat 56, and which, when opened, allows the power piston 54 to freely move through the hydraulic fluid contained inside the power cylinder 14.

Accordingly, when pressure is supplied to the power cylinder 14 through the main supply bore 17, while the valve plunger 57 of the power piston 54 is open, the piston rod 20 and its rod portion 20' act as a differential piston, on account of their different diameters at the end flanges 13 and 15', thereby executing a rapid approach motion of the die closing unit toward its closed position. If the valve plunger 57 of the power piston 54 is then closed, the much larger effective area of the piston 54 itself becomes effective, thereby producing a greatly increased closing pressure on the piston rod 20. The opening motion is similarly obtained as an accelerated motion, when pressure is supplied to the supply bore 16 of the auxiliary cylinder 15, thereby pressurizing the latter and causing the piston 64 and the piston rod 20 to execute a rapid separating motion of the die closing unit.

The valve plunger 57 is hydraulically actuated via channels 142 and 143 which lead from a connection 139 at the thrust plate 21 (FIG. 5) to a fixed clamping ring 58 on the piston rod. The clamping ring 58 engages a thread 59 on the piston rod, guiding the valve plunger 57 for axial motion, and cooperating with it to form a linear actuator configuration.

In conclusion, it is an essential feature of the novel die closing unit of this invention that, although of the push-type, the unit uses only a single centrally located piston rod attached to a single power piston, thus engaging the movable die carrier frame 12 along a centrally located line of force transmission, at least when the high closing pressure is applied to the molding die. Only within the structure of the movable die carrier frame 12 itself is the thrust then transmitted from a central location on the pressure transfer wall 12b to an annular area of the die mounting wall 12a.

From the foregoing disclosure, it should now also be readily apparent that the use of a power cylinder and coaxially connected auxiliary cylinder as described hereinabove, though preferable operationally, it not a prerequisite for all applications of the present invention, other hydraulic opening and closing means being employable in their place.

It will also be appreciated that the movable die carrier member, although preferably a hollow frame as described hereinabove could be so modified that it takes the shape of a single heavy plate with elongated guide sockets rigidly extending therefrom. In such a case it might be necessary to extend the ejector drive cylinder somewhat deeper into the piston rod 20, and/or to make the thrust plate 21 axially larger and hollow.

It is further possible to use the proposed novel centrally connected single piston rod configuration and its built-in drive for accessory devices in connection with a die closing unit where the movable die carrier plate or frame, instead of being guided on the tie rods of a stationary guide frame, is rigidly attached to and carried by longitudinally movable guide rods and the longitudinal end portions of these rods are guided in the stationary die carrier plate and head plate, respectively. However, because these reciprocating guide rods cannot transmit the longitudinal closing force reaction between the two stationary plates, separate longitudinal braces between the two plates are then necessary.

It should therefore be understood that the foregoing disclosure describes only preferred applications and embodiments of the present invention and that it is intended to cover all changes and modifications of these examples of the invention which fall within the scope of the appended claims.

I claim the following:

1. A push-type die closing unit for an injection molding machine, serving to open and close the die halves of an injection molding die in a reciprocating motion along the longitudinal center axis of the unit, the die closing unit comprising in combination:
    a stationary die carrier plate to which the stationary half of the injection molding die is attachable and which extends transversely to the unit center axis;
    a stationary head plae likewise extending transversely to the unit center axis, on the other side of the emplacement of the injection molding die and at a distance therefrom;
    a movable die carrier member to which the movable half of the injection molding die is attachable and which is arranged axially between the stationary die carrier plate and the staionary head plate;
    means for guiding the movable die carrier member and attached die half in relation to the stationary die carrier plate and head plate for opening and closing movements along the unit center axis between a forward closed position and a rearward open position; and
    a hydraulic linear actuator mounted axially behind the stationary head plate, said actuator including: a power cylinder enclosing a power piston having valve means for selectively hydraulically bypassing the power piston, an auxiliary cylinder extending coaxially to the rear of the power cylinder and enclosing an auxiliary piston, a piston rod carrying both said power piston and said auxiliary piston and extending in the unit center axis, the forward extremity of the piston rod being connected to the movable die carrier member for the transmission thereto of opening and closing forces, including elevated closing pressures; and wherein
    the movable die carrier member defines, in the area immediately surrounding the unit center axis between the movable die half and the piston rod, a central space for the accommodation, at least in part, of an ejector device or other accessory device; and
    the piston rod has a hollow forward portion accommodating therein an accessory drive in the form of an accessory hydraulic linear actuator to which said accessory device is connectable.

2. A die closing unit as defined in claim 1, wherein said accessory hydraulic linear actuator includes a cylindrical bore inside the forward end portion of the piston rod, an accessory drive piston with a forwardly extending accessory drive piston rod cooperating with said bore, and a forward end flange in the form of an enlarged thrust plate interposed between and rigidly connecting together the piston rod and the movable die carrier member.

3. A die closing unit as defined in claim 2, wherein the thrust plate between the piston rod and the movable die carrier member includes in its body hydraulic connections, including connections for two channels which open into said bore in the piston rod on opposite axial sides of the accessory drive piston; and
    the movable die carrier member further includes a number of clamping bolts reaching axially through the thrust plate and into the wall of the hollow piston rod portion.

4. A die closing unit as defined in claim 1, wherein the means for guiding the movable die carrier member includes a plurality of parallel tie rods extending between said two stationary plates and rigidly connected thereto so as to define with them a rigid guide frame; and
    the movable die carrier member includes axially extending guide sockets engaging the tie rods.

5. A die closing unit as defined in claim 4, wherein the movable die carrier member is a rigid die carrier frame, having a die mounting wall on the forward axial side thereof, a pressure transfer wall spaced axially to the rear of the die mounting wall and connected to the piston rod, and pressure transfer means rigidly connecting the die mounting wall to the pressure transfer wall;
    the guide sockets constitute at least part of said pressure transfer means; and
    the central space for the accommodation of an accessory device is arranged inside said die carrier frame.

6. A die closing unit as defined in claim 5, wherein said accessory hydraulic linear actuator includes an accessory drive piston with an accessory drive piston rod extending forwardly into said central space of the die carrier frame;
    the forward portion of the accessory drive piston rod carries a contact arm moving with said piston rod inside said central space;

the die carrier frame includes two axially adjustable stationary end switches cooperating with the contact arm so as to adjustably delimit the stroke of the accessory drive piston.

7. A die closing unit as defined in claim 6, wherein said contact arm extends radially from the accessory drive piston rod, being guided to move along an axial path;

the two switches are proximity switches responding to the approach of the outer radial extremity of the contact arm; and the proximity switches are clampingly held against axially aligned clamping surfaces of the movable die carrier frame, in relation to which they are adjustable axially.

8. A push-type die closing unit for an injection molding machine, serving to open and close the die halves of an injection molding die in a reciprocating motion along the longitudinal center axis of the unit, the die closing unit comprising in combination:

a stationary die carrier plate to which the stationary half of the injection molding die is attachable and which extends transversely to the unit center axis;

a stationary head plate likewise extending transversely to the unit center axis, on the other side of the emplacement of the injection molding die and at a distance therefrom;

a movable die carrier member to which the movable half of the injection molding die is attachable and which is arranged axially between the stationary die carrier plate and the stationary head plate;

means for guiding the movable die carrier member and attached die half in relation to the stationary die carrier plate and head plate for opening and closing movements along the unit center axis between a forward closed position and a rearward open position; and a hydraulic linear actuator mounted axially behind the stationary head plate, said actuator having a piston rod extending in the unit center axis and being rigidly connected to the movable die carrier member for the transmission thereto of opening and closing forces, including elevated closing pressures; and wherein:

the hydraulic linear actuator includes: a power cylinder rearwardly adjoining the stationary head plate, a smaller-diameter auxiliary cylinder coaxially adjoining the rear extremity of the power cylinder, and a mounting flange connecting and centering the two cylindrs;

the piston rod extends through the power cylinder and into the auxiliary cylinder, carrying a matching double-acting power piston inside the former and a matching single-acting auxiliary piston inside the latter;

the piston rod portion between the power piston and auxiliary piston extends sealingly through the mounting flange between the two cylinders with a diameter which is smaller than the diameter of the piston rod portion extending forwardly from the power piston;

the piston rod further has a hollow forward end portion for the accommodation therein of a drive for an accessory device, said drive being an accessory hydraulic linear actuator; and the power piston includes at least one bypass channel extending from one axial side thereof to the other side, and hydraulically operated valve means for selectively opening and closing the bypass channel, so that the piston rod in the power cylinder acts as a differential piston, producing a rapid die closing motion, when the power cylinder is pressurized with the bypass channel held open, and the auxiliary piston produces a rapid die opening motion, when the forward side of the auxiliary piston is pressurized with the power piston bypass channel held open, while the power piston produces an elevated closing pressure, when its rear side is pressurized with the bypass channel closed.

9. A die closing unit as defined in claim 8, wherein the stationary head plate serves as a forward end flange for the power cylinder, having an axial centering recess on its rear side;

the power cylinder is a tubular section, engaging with its forward extremity said axial recess of the head plate;

the mounting flange between the two cylinders is integrally attached to the smaller auxiliary cylinder, having an axial centering recess on its forward side engaged by the other extremity of the power cylinder; and the linear actuator further includes a number of cylinder tie rods extending axially between the head plate and the mounting flange, clamping the power cylinder between them.

10. A die closing unit as defined in claim 9, wherein the mounting flange between the power cylinder and the auxiliary cylinder includes hydraulic connections for both cylinders.

11. A die closing unit as defined in claim 8, wherein the power piston has a plurality of angularly spaced bypass channels and further includes, as part of its valve means, an annular valve seat surrounding the openings of said channels on the rear side of the power piston;

the valve means further includes an annular valve plunger arranged on the rear side of the power piston, the valve plunger being sealingly movable along the piston rod towards and away from said valve seat, thereby opening and closing the bypass channels; and the valve means still further includes hydraulic linear actuator means cooperating with the valve plunger so as to move the latter, and a central hydraulic flow channel extending through a length portion of the piston rod to said plunger actuator means.

12. A die closing unit as defined in claim 11, wherein the rigid connection between the forward extremity of the piston rod and the movable die carrier member includes an intermediate radially enlarged thrust plate and a number of clamping fasteners traversing said member and said plate axially; and the outside connection for said central hydraulic flow channel of the power piston valve means is arranged on said thrust plate.

13. A push-type die closing unit for an injection molding machine, serving to open and close the die halves of an injection molding die in a reciprocating motion along the longitudinal center axis of the unit, the die closing unit comprising in combination:

a stationary die carrier plate to which the stationary half of the injection molding die is attachable and which extends transversely to the unit center axis;

a stationary head plate likewise extending transversely to the unit center axis, on the other side of the emplacement of the injection molding die and at a distance therefrom;

a plurality of tie rods extending between the two plates, parallel to and radially spaced from the unit center axis, and connected to said stationary plates so as to define with them a rigid elongated guide frame;

a rigid movable die carrier frame to which the movable half of the injection molding die is attachable, the die carrier frame being engaged by the tie rods for guided movement therealong between a forward closed position and a rearward open position; and a hydraulic linear actuator mounted axially behind the stationary head plate, said actuator having a piston rod extending in the center axis of the die closing unit and connected to the movable die carrier frame for the transmission thereto of opening and closing forces, including elevated closing pressures; and wherein the movable die carrier frame includes: a die mounting wall on the forward axial side thereof; a pressure transfer wall which is substantially continuous in the transverse direction and spaced axially to the rear of said die mounting wall, and to which is connected the forward extremity of the piston rod; a plurality of tie rod embracing guide sockets defined by said die mounting and pressure transfer walls; and pressure transfer ribs extending between and rigidly connecting said two walls in the area located radially inside the guide sockets, while leaving free a central space between said walls, for the accommodation therein of an accessory device;

the piston rod of the hydraulic linear actuator includes, at its connected forward extremity, a thrust plate with which it engages the rear side of the pressure transfer wall in a central area whose radial extent is greater than the minimum radial distance of the pressure transfer ribs on the opposite side of the pressure transfer wall; and the hydraulic linear actuator further includes: a power cylinder enclosing a power piston seated on the piston rod; valve means associated with the power piston for selectively hydraulically bypassing the power piston; and an auxiliary cylinder extending coaxially to the rear of the power cylinder and enclosing an auxiliary piston seated on the same piston rod.

14. A die closing unit as defined in claim 13, wherein the tie rods are four in number and their axes pass through the four corners of a regular square whose center coincides with the unit center axis; and the movable die carrier frame includes four guide sockets integrally connecting both of said frame walls and enclosing the tie rods.

15. A die closing unit as defined in claim 14, wherein each guide socket includes an elongated axial bore with two axially spaced guide bushings pressed into it which slidably engage the associated tie rod with minimal clearance; and the axial distance between the guide bushings in the guide socket bores is at least equal to the diameter of the associated tie rods.

16. A die closing unit as defined in claim 14, wherein the pressure transfer ribs extend radially inwardly from the four guide sockets, the inner edges of the pressure transfer ribs being located at approximately mid-distance between the tie rod axes and the unit center axis; and the four pressure transfer ribs are interconnected in pairs by axially shallow connecting ribs on the forward side of the pressure transfer wall.

17. A die closing unit as defined in claim 13, wherein the tie rods engage said axially spaced stationary plates through smooth bores in said plates of a diameter equal to the diameter of the tie rods with which they guide the movable die carrier frame;

each tie rod has end portions on both extremities extending a distance beyond the associated plate bores; and the tie rod tensions created by said closing pressures are transmitted to the stationary plates by abutment means on said tie rod end portions bearing against the outer sides of the stationary plates.

18. A die closing unit as defined in claim 17, wherein the guidance diameter of tie rods is also their maximum diameter;

each tie rod includes in its protruding end portions an abutment groove; said groove having a substantially planar abutment face oriented toward the associated plate;

each tie rod connection includes a split abutment ring seated in said abutment groove and having one axial end face bearing against said abutment face and the other axial end face bearing against the associated plate in the area surrounding the plate bore; and the tie rod connections further include means for retaining the abutment rings inside their grooves and means for axially preloading the tie rods against said plates in the sense of said abutment connections.

19. A die closing unit as defined in claim 18, wherein said retaining means and said clamping means are constituted by clamping caps which enclose the protruding tie rod end portions and their abutment rings and bear against the extremities of the tie rods under the action of clamping fasteners pulling the clamping caps against the stationary plates.

20. A die closing unit as defined in claim 13, wherein the hydraulic linear actuator is directly attached to the stationary head plate, the latter serving as the forward end flange for the power cylinder of the actuator; and the hydraulic linear actuator further includes an intermediate flange mounted between the power cylinder and the auxiliary cylinder and a plurality of cylinder tie rods clamping the power cylinder between the head plate and the intermediate flange.

* * * * *